(12) United States Patent
Wolochuk

(10) Patent No.: US 6,186,744 B1
(45) Date of Patent: Feb. 13, 2001

(54) VOLUMETRIC AIRFLOW INDICATOR AND CONTROL DEVICE

(75) Inventor: Mark C. Wolochuk, Portland, OR (US)

(73) Assignee: Synetics Solutions Inc., Tigard, OR (US)

(*) Notice: Under 35 U.S.C. 154(b), the term of this patent shall be extended for 0 days.

(21) Appl. No.: 09/097,561

(22) Filed: Jun. 15, 1998

Related U.S. Application Data

(63) Continuation-in-part of application No. 08/732,964, filed on Oct. 12, 1996.

(51) Int. Cl.[7] .................................................. F04B 49/06
(52) U.S. Cl. ......................................... 417/44.2; 417/44.3
(58) Field of Search ................................. 417/44.2, 44.4, 417/44.5, 44.6, 44.3, 44.8, 44.9; 415/118; 55/210, 270; 95/19; 73/38, 866.5, 863.03

(56) References Cited

U.S. PATENT DOCUMENTS

| | | | |
|---|---|---|---|
| 4,552,059 | * 11/1985 | Potter | 98/115.1 |
| 4,719,791 | * 1/1988 | Greiner et al. | 73/38 |
| 5,000,052 | * 3/1991 | Sipin | 73/863.03 |
| 5,410,920 | * 5/1995 | Westwick | 73/866.5 |
| 5,505,763 | * 4/1996 | Reighard et al. | 95/19 |
| 5,586,861 | * 12/1996 | Berger | 415/118 |
| 5,672,050 | * 9/1997 | Webber et al. | 417/18 |
| 5,988,149 | * 11/1999 | Gates | 123/568.21 |

* cited by examiner

Primary Examiner—Teresa Walberg
Assistant Examiner—Daniel Robinson
(74) Attorney, Agent, or Firm—Miller Nash LLP

(57) ABSTRACT

A device for measuring and automatically controlling the volumetric rate of air through an air handling system used in connection with clean rooms. A desired volumetric air rate is maintained by measuring air pressure differentials between different locations in the system. The volumetric air rate is adjusted by using a variable frequency drive to adjust the speed of the fan in response to a measured pressure differential.

4 Claims, 3 Drawing Sheets

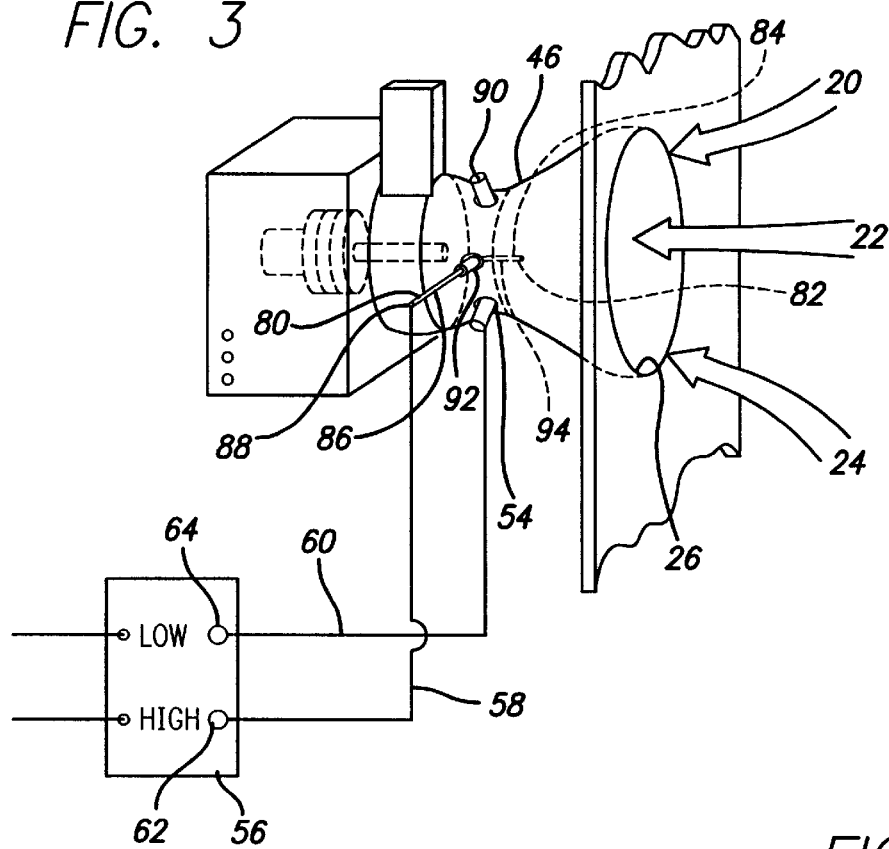
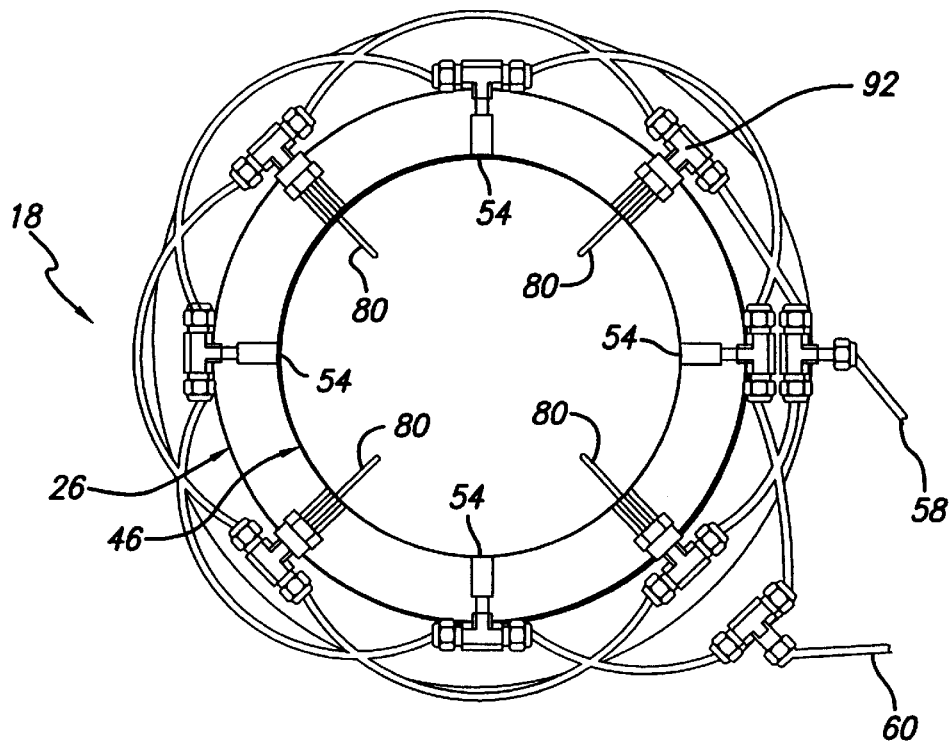

VOLUMETRIC AIRFLOW INDICATOR AND CONTROL DEVICE

This is a continuation-in-part of application Ser. No. 08/732,964, filed on Oct. 12, 1996.

TECHNICAL FIELD

This invention relates to a device for measuring, calculating, displaying, and controlling the volumetric rate of an air delivered to a clean room.

BACKGROUND INFORMATION

Semiconductor fabrication facilities utilize clean rooms for various chip manufacturing operations. Because of the nature of the manufacturing operations, it is usually a requirement that a very precise and constant rate of purified air be supplied to any given clean room. The purified air is fan-driven and purified by one or more filters (generally HEPA filters are used, which are well-known). The manufacturing operations may be adversely affected if a constant volumetric air rate is not maintained.

Over time, the filters become increasingly clogged or loaded with particulate matter which impedes the air rate delivered to the clean room. Filter loading creates a need to make compensating adjustments in order to maintain a constant air rate.

In the past, it was commonplace to use fixed-speed fans to deliver the air. Air adjustments were made by moving or repositioning barriers in the duct work or air path leading into the clean room. These barriers were usually in the form of screens or dampers and functioned to alter the cross-sectional area of the air path. The result was a change in air velocity and rate. With this adjustment method, however, it is difficult to precisely adjust the air.

Alternatively, the air may be adjusted by using a variable frequency drive ("VFD") to control the fan. A VFD adjusts the frequency of the input power to the fan motor, which adjusts the fan speed, thereby adjusting the volumetric air rate. The higher or lower the fan speed, the higher or lower the air rate, respectively.

When VFDs are used in conjunction with clean room air, the clean room operator must repeatedly measure how much the actual volumetric air rate has deviated from a pre-set standard and make corresponding adjustments to fan speed. In the past, the operator made the air rate measurement by using a hand-held measuring device. Then, depending on the measurement, the operator gradually adjusted fan speed until the air rate returned to the pre-set standard. This was, of course, labor-intensive, but it also had a significant drawback in that the air rate could drop out of adjustment a significant amount before the operator detected it via a manual measurement. If the air rate changed too much before detection, it could have an adverse impact on clean room manufacturing operations. The present invention solves these problems.

SUMMARY OF THE INVENTION

The invention is an automated system for controlling the volumetric rate of air delivered to a clean room. The automated system includes the use of at least one air duct for supplying conditioned air to the clean room. Air is driven through the duct by a fan. Incoming air is directed into the fan through an inlet section. In one embodiment, the system has a first pressure sensor located outside the fan inlet, and a second pressure sensor located in the inlet section, to thereby create a measurable pressure differential that can be correlated to air rate. In a second embodiment, the pressure differential is taken from the difference between the total pressure and the static pressure inside the inlet section.

A system operator inputs a desired rate into a programmable controller that is connected to both the fan and the pressure sensors. The controller is programmed to correlate the desired air rate with a set-point pressure differential between the pressure sensors. In other words, a certain set-point pressure differential must be maintained in order to maintain the desired air rate at a constant level. The controller incrementally adjusts fan speed on an ongoing basis so that the set-point pressure differential will always be maintained, until a different air rate is desired and selected by the operator.

The system must be calibrated before it can be used to supply clean room air. calibration is accomplished by measuring known volumetric air rates by independent means and correlating each air rate to a set-point pressure differential that is also measured at the time the air rate is independently measured. By taking a sufficient number of calibration data points, it is possible to create a mathematical relationship between air rate and pressure differential for the controller to use for maintaining selected rates at a constant.

In one form, the fan inlet is a symmetric convergent/divergent cone having a throat region. The first sensor is located outside and away from the inlet to the cone and the second sensor is located in the throat region. In this embodiment, the first and second sensors are conventional "pressure tap" sensors.

In a second embodiment of the invention, the first pressure sensor is an L-shaped tube sensor located inside the cone at the throat region. A first tube section of the tube lies parallel to the direction of the incoming air that travels through the cone and extends a short distance towards the inlet of the cone. An orifice at the end of this first tube section faces into the incoming air flow. In this manner, the tube is able to sense the total air pressure at the throat of the cone. At the throat region of the cone, the tube bends 90 degrees to form a second tube section. This second tube section passes through the cone's wall at that point, and the first pressure reading is taken from this point. Additionally, one or more conventional pressure tap sensors remain at the throat for sensing the static air pressure at the throat region. As with the first embodiment, air rate is determined by measuring the difference in air pressure between the two sensors. The first air pressure reading (total pressure) is taken from the tube, and the second pressure reading (static pressure) is taken from the pressure tap sensors at the throat.

The invention as summarized above will become better understood upon review of the following description which is to be taken in conjunction with the accompanying drawings.

BRIEF DESCRIPTION OF THE DRAWINGS

In the drawings, like reference numerals and letters refer to like parts throughout the various views, and wherein:

FIG. 3 is a view like FIG. 1 but is a partial schematic of the second embodiment of a system for controlling volumetric air delivered to a clean room;

FIG. 5 is a cut-away, rear view of the cone shown in FIGS. 3 and 4.

BEST MODE FOR CARRYING OUT THE INVENTION

Figure 1:
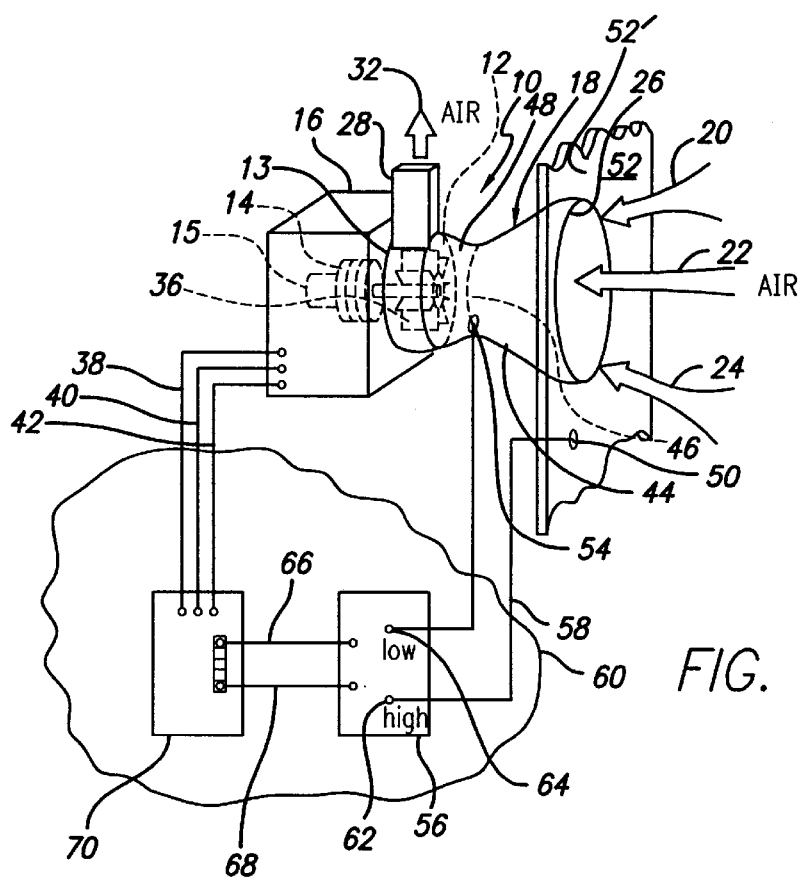
FIG. 1 is a schematic view of the first embodiment of a system for controlling volumetric air delivered to a clean room.

Referring now to FIG. 1, reference numeral 10 generally indicates a volumetric air control system constructed in accordance with the first embodiment of the invention. The control system 10 utilizes a fan 12 which drives air into a clean room (not shown). The fan 12 is driven in rotation by a motor (which is schematically indicated at 14). The motor is received inside a housing 16. The motor speed, and therefore the fan speed, is controlled by a variable frequency drive ("VFD") (which is schematically indicated at 15).

The motor 14 drives the fan 12 in rotation so that its blades draw air through a cone-shaped inlet section 18 (hereafter called "cone" or sometimes called "duct"). The incoming air, which is generally indicated at 20, 22, and 24, is conditioned air having a specific temperature for use in the clean room. It enters the inlet 26 of the cone 18 and is driven by the fan 12 into a plenum 13 and then through duct 28. Although the plenum 13 is shown schematically as surrounding only the fan 12, the plenum 13 may also be configured such that it also surrounds the inlet cone 18, and housing 16, forming with an inner surface 521, a chamber into which the incoming air flows before entering the duct 28. The exiting air, indicated generally at 32, is then driven through filters (not shown) and passed on into the clean room.

The individual blades 36 of the fan 12 are shown for illustrative purposes only. In actuality, they will be sized and shaped as necessary to draw conditioned air through the cone 18 and drive the air to and through the filters, as shown at 32. The VFD, motor, and fan 15, 14, 12 are conventional and would be very familiar to a person skilled in the art. For this reason, it is not necessary to provide any further description of this particular part of the system 10. Moreover, a person skilled in the art would understand that the speed of the fan 12 is very easy to adjust by altering the motor frequency input 38, 40, 42. Once the skilled person knows that a VFD is used to control fan speed, he or she would know how to adjust the air rate.

In accordance with the invention, the cone 18 is a symmetrically convergent/divergent cone. In other words, one portion of the cone 18, indicated at 44, converges symmetrically from inlet 26 to a throat region, indicated by the dashed line 46. The throat 46 defines the smallest cross-sectional area across the cone 18 from the inlet 26 to the fan 12. At that location, a line that is tangent to the inner surface of the cone 18 will also be parallel to the direction of air through the cone 18.

In the first embodiment of the invention, a first pressure sensor 50 is located away from the cone inlet 26 on any suitable outer surface 52, in a manner such that the sensor 50 is capable of providing a signal indicating air pressure outside of the cone 18. A second sensor 54 is located on the inside of the cone 18 at its throat 46.

Both sensors 50, 54 are conventional "pressure tap" sensors which are commonplace and well-known in the art. Sensors of this type essentially present an opening that is coplanar or flush with the surface across which air passes. In other words, and referring to the second sensor 54 in particular, it presents a small opening on the interior surface of the cone 18 at a location along the line 46 which defines the cone's throat. Air passes over the opening which enables the sensor to generate a pressure signal, as will be further described below.

The sensors 50, 54 are used as part of a unit commonly known as a pressure transmitter. A suitable pressure transmitter capable of performing the functions required by the present invention is a SETRA™ C264 Pressure Transmitter, which is indicated at 56.

The pressure transmitter 56 is connected to pressure sensor openings 50, 54 by air tubes 58, 60. One air tube 58 interconnects the first pressure sensor opening 50 to a "high" opening 62 on the pressure transmitter 56. Similarly, the second tube 60 connects the opening 54 on the cone 18 to a "low" opening 64 on the transmitter 56.

The transmitter 56 outputs an electrical signal 66, 68 corresponding, to the pressure differential between the "low" and "high" openings 64, 62 of the transmitter 56. In the case of the SETRA™ C264 Transmitter, this output signal may vary from 4 to 20 milliamps. The electrical output 66, 68 of the transmitter 56 is connected to a controller 70.

The controller 70 is a programmable logic controller ("PLC") and includes a microprocessor, memory, and control circuitry. PLCs are well-known devices that can be obtained from any number of sources. A suitable PLC for use in connection with the system 10 is a SIEMENS™ 7-200.

Figure 4:
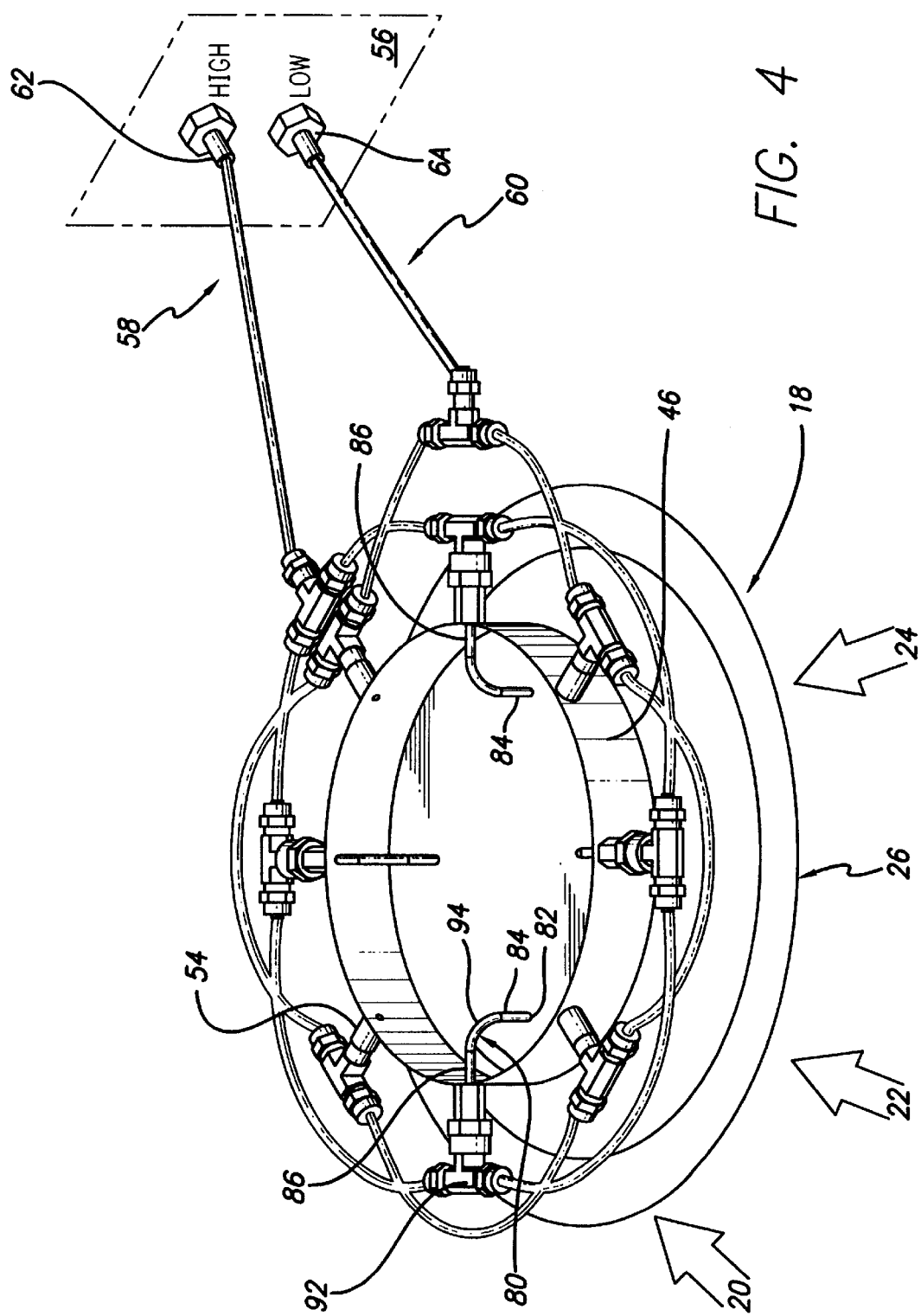
FIG. 4 is a cut-away, isometric view of the cone portion of the embodiment shown in FIG. 3.

The second embodiment of the invention is shown in FIGS. 3–5. The pressure tap sensor 50 located outside of the cone 18 is replaced by one or more L-sh aped tube sensors 80 located at the throat region 46. The tube 80 has a first tube section 84 and a second tube section 86. The methods and principles of measuring air pressure with tubes are well-known in the art and will not be described here in great detail. Basically, tube 80 is positioned in the interior of the cone at 46 such that the first tube section 84 lies essentially parallel to the direction of the incoming air stream 20, 22, and 24. Tube section 84 extends from the throat region 46 towards the inlet 26. There is an orifice 82 at the end of tube section 84 which faces directly into the incoming air stream. With the tube 80 oriented in this manner, the total air pressure at the throat region 46 can be measured.

As seen in FIGS. 3 and 4, at 94, the tube 80 bends 90 degrees at the throat region 46. From that bend, the tube 80 (indicated as tube section 86 in FIGS. 3 and 4) extends to the wall of the cone and passes through a fitting 92. Air tube 58 is connected to orifice 88 at the end of tube section 86. It is to be appreciated that tube section 86 can terminate at the fitting 92 instead of passing through it (as shown in FIGS. 4–5), with the air tube 58 connected directly to fitting 92. Air tube 58 is then connected to the "high" opening 62 on pressure transmitter 56 for providing the total pressure reading to the transmitter 56.

As with the first embodiment of the invention, one or more pressure tap sensors 54 provide static air pressure readings at the throat region 46. The air tube 60 connects these sensors to the "low" opening 64 on the pressure transmitter 56. The transmitter 56 generates an electrical signal which is proportional to the difference between the total pressure and the static pressure. In this fashion, the pressure differential is taken from the tube 80 (total pressure reading) and from the pressure tap sensor 54 (static pressure reading). The transmitter 56 then sends the signal corresponding to this pressure differential to the controller 70.

With the above description, a person skilled in the art would be able to easily implement the various physical components described above in connection with providing air to a clean room. The skilled person, however, would also need to know how to calibrate the controller 70.

Any time the system 10 is installed for use in conjunction with a particular clean room, it must be calibrated. Calibration involves gathering operational data for the system 10 after its initial installation. Because there will be structural variations from one clean room installation to the next (e.g., different duct work, fan sizes, cone sizes, etc.), each installation is unique.

Calibration involves gathering data which relates air rate (Q) to the pressure differential ΔP measured between the first and second sensors 50, 54 for the first embodiment or between tube 80 and sensor 54 in the second embodiment. In other words, the fan 12 is set to a certain speed and the air rate through the cone 18 is independently measured via conventional means. The pressure differential between sensors 50, 54 (or between sensors 80 and 54) is recorded for that air rate which creates a set-point pressure differential corresponding to the rate. The fan is then changed to another speed to create a new rate which is also independently measured. Similarly, the pressure differential is recorded to create a different set point corresponding to the second air rate. This is done many times to create a series of data points correlating set-point pressure differentials to different volumetric air rates. This data can then be fit to a curve where Q will be nearly linear with the square root of ΔP.

Figure 2:
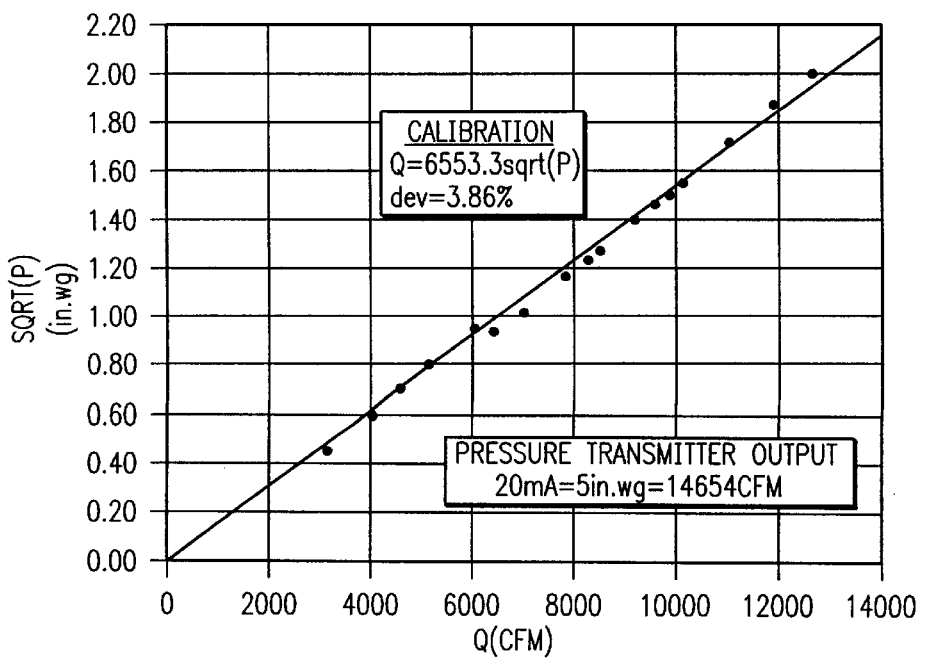
FIG. 2 is a plot of the square root of pressure differences against volumetric air.

By way of example, a typical calibration curve is shown in FIG. 2. The curve enables the creation of an equation that is stored in the controller 70 such that set-point pressure differentials are a function of volumetric air rate. After calibration, all the operator needs to do is select the desired air rate Q, input it to the controller 70, and the controller will then calculate the set-point pressure differential required between sensors 50, 54 (or between sensors 80 and 54) in order to maintain that rate.

The controller 70 detects the actual pressure differential from the signal 66, 68 provided by pressure transmitter 56. If the signal 66, 68 indicates that the actual pressure differential is not the same as the set-point differential required in order to maintain the selected air rate, then the controller 70 will make an appropriate adjustment to the VFD to increase or decrease the speed of the fan 12, as necessary, until the measured pressure differential matches the set-point differential.

Fan speed is increased or decreased incrementally by any one of a number of applicable control theories. For example, "proportional integer ("PI") control is a common control scheme that will work quite well in the system 10 and is easily implemented in the SIEMENS™ S7-200 Controller. PI control is basically an algorithm that generates a particular output based on a given input-set point ratio. This would be very familiar to a person skilled in the art.

Rather than create an equation that draws a mathematical relationship between air rate and pressure differential, it would also be possible to calibrate the system 10 by simply creating a data "look-up" table that is stored in the memory of the controller. This would require taking a large number of calibration data points relating different air rates to set-point pressure differentials in order to create an accurate table. Using this method, once a desired rate is entered into the controller 70, it would simply "look-up" the desired set-point pressure differential corresponding to the input (or interpolate between the closest set-points in the table to produce the desired set-point). At the present time, it is believed that producing an equation is a better method because it requires less effort during the calibration process.

The above description sets forth what is currently believed to be the best mode for carrying out the invention. It is to be understood that further variations and improvements can be made to the invention which will entail the creation of embodiments other than the one specifically disclosed above. For this reason, what is considered to be the scope of the invention is not to be limited by the preceding description. Instead, the invention is to be solely limited by the claim or claims which follow.

What is claimed is:

1. An automated system for controlling the volumetric rate of air delivered to a clean room, comprising:
   an air duct for supplying air to the clean room, the air duct having an inlet opening, and wherein the air duct includes a convergent-divergent portion with a throat region that defines a minimum cross-section area across the convergent-divergent portion, wherein air flow in a path from the inlet opening through the throat region;
   an L-shaped tube sensor positioned at a location substantially at the throat region and having an orifice facing the inlet opening, at least part of the tube sensor and the orifice intruding into the airflow path the tube sensor being operable to generate a first signal indicating total air pressure at that location;
   a pressure tap sensor positioned at a location substantially at the throat region, the pressure tap sensor being operable to generate a second signal indicating static air pressure at that location;
   a variable frequency drive connected to a fan operably positioned for driving air through the air duct, wherein the variable frequency drive controls the fan speed, thereby adjusting the air rate through the air duct;
   a programmable device connected to the tube sensor for receiving the first signal and to the pressure tap sensor for receiving the second signal, the programmable device being operably connected to the variable frequency drive such that the progranunable device is capable of adjusting the fan speed, and further the programmable device being operable to create a selected air rate through the air duct which generally corresponds to a set-point pressure differential between the first and second signals.

2. The system of claim 1, wherein the tube sensor and the pressure tap sensor are each positioned at a plane defined by the minimum cross-sectional area across the convergent-divergent portion.

3. The system of claim 1, wherein system operation is calibrated prior to use of the system by taking the following steps:
   (a) the system is operated to create a set of known air rates through the duct;
   (b) the pressure differential between the tube sensor and the pressure tap sensor is measured as a set-point for each corresponding air rate of the set; and
   (c) the controller is programmed to substantially correlate each set-point with each corresponding air rate of the set.

4. The system of claim 1, wherein the tube sensor is substantially adjacent the pressure tap sensor.

* * * * *